M. J. GORRELL AND H. S. McLEOD.
AUTOMOBILE TOP.
APPLICATION FILED APR. 21, 1921.

1,413,474.

Patented Apr. 18, 1922.

2 SHEETS—SHEET 1.

Inventors
M. J. Gorrell
H. S. McLeod

By F. K. Bryant
Attorney

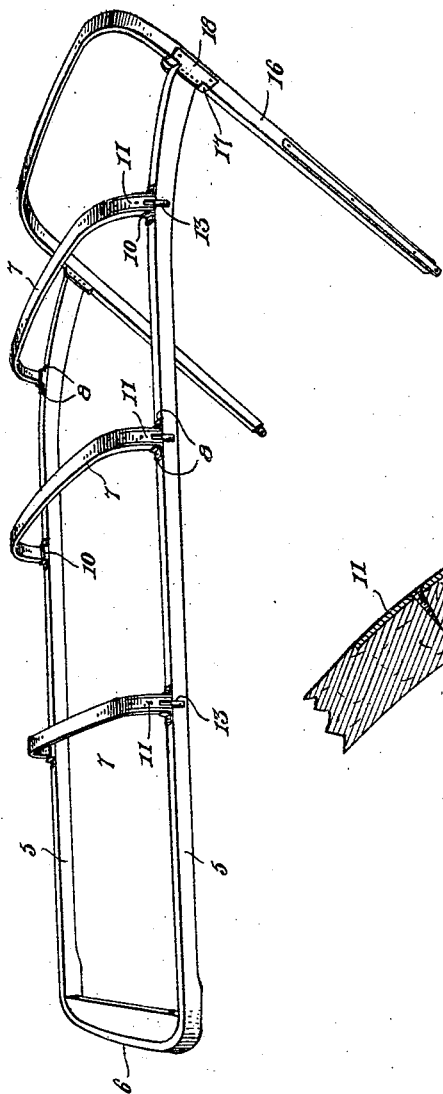
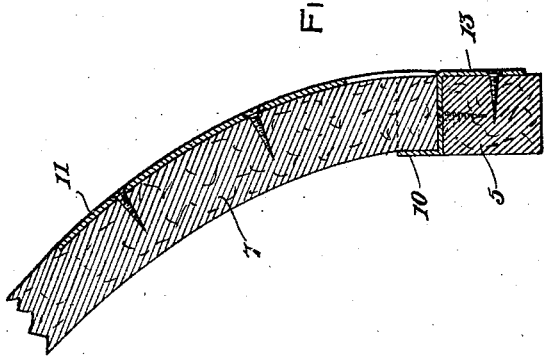

UNITED STATES PATENT OFFICE.

MILO J. GORRELL AND HARRY S. McLEOD, OF DELPHOS, OHIO.

AUTOMOBILE TOP.

1,413,474. Specification of Letters Patent. Patented Apr. 18, 1922.

Application filed April 21, 1921. Serial No. 463,135.

*To all whom it may concern:*

Be it known that we, MILO J. GORRELL and HARRY S. McLEOD, citizens of the United States of America, residing at Delphos, in the county of Allen and State of Ohio, have invented certain new and useful Improvements in Automobile Tops, of which the following is a specification.

This invention relates to certain new and useful improvements in automobile tops of that type known as rigid or permanent tops.

The primary object of the invention is to provide a permanent automobile top which provides cheapness in manufacture and simplicity in connection with the structure of the different members thereof.

A further object of the invention is to provide a top of the rigid type embodying a U-shaped horizontal frame member, the legs of which constitute the side rails of the top and which have a plurality of U-shaped bent-wood bows fixed thereon at suitable intervals, a rear bow being suitably fastened to the rear ends of the legs of the U-shaped frame member so as to project above and below the latter and so as to be capable of folding to a horizontal position for convenience in crating for shipment.

A still further object of the invention is to provide stamping members for effectively connecting the several parts of the top frame, the stamped member for connecting the rear bow to the horizontal U-shaped frame member being so constructed as to accommodate the rear bow at different angles as required for attaching the top to different makes of automobiles.

Other objects will appear as the nature of the invention is better understood, and the same consists in the novel form, combination and arrangement of parts hereinafter more fully described, shown in the accompanying drawings and claimed.

Figure 1:
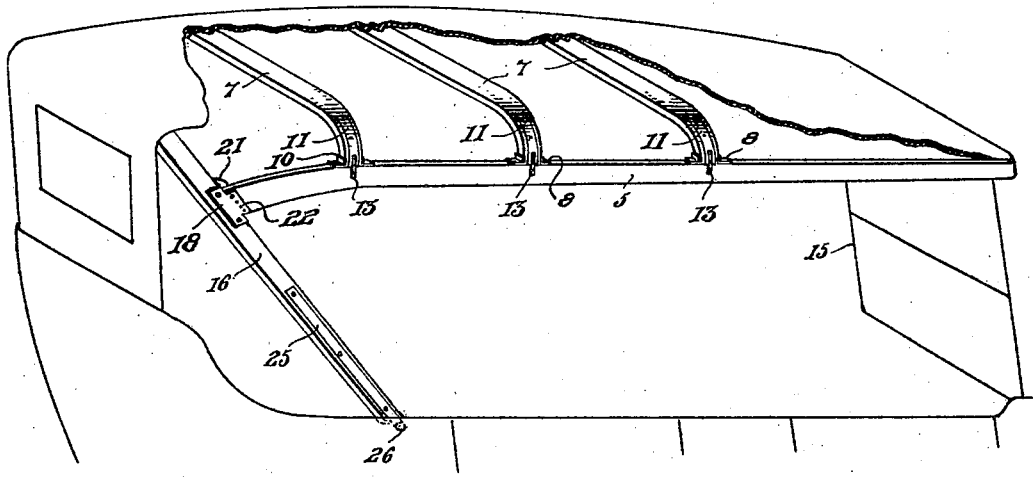
Figure 1:
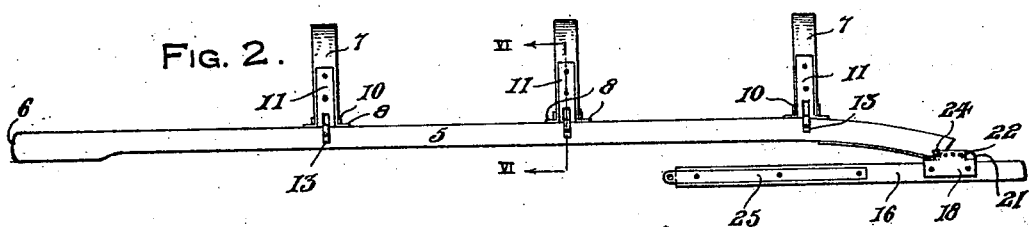
Figure 1:
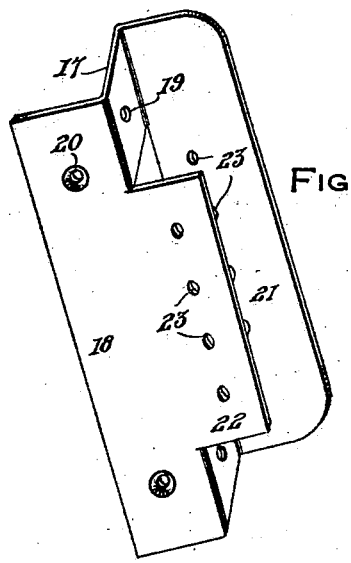
Figure 1:
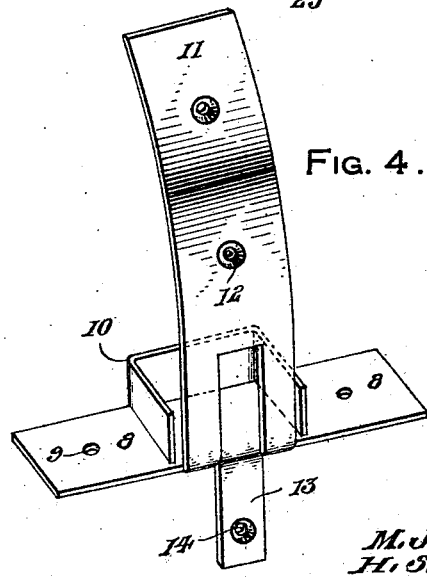

In the drawings, wherein like reference characters designate corresponding parts throughout the several views, Figure 1 is a fragmentary perspective view of an automobile equipped with a top frame constructed in accordance with the present invention, the covering of the frame being partly broken away, Figure 2 is a side elevational view of the top frame shown in Fig. 1 with the rear bow collapsed, Figure 3 is a perspective view of one of the metal stampings employed for attaching the rear bow, Figure 4 is a similar view of the metal stamping employed for attaching the bent-wood bows which are positioned forwardly of the rear bow, Figure 5 is a perspective view of the frame in expanded condition, and Figure 6 is a sectional view taken on line VI—VI of Fig. 2 and drawn on a larger scale.

Referring more in detail to the several views the present invention embodies a horizontal substantially U-shaped frame member, the legs of which provide side rails 5 which are connected at their forward ends by the intermediate portion 6 of said frame member. The usual bent-wood bow is used in the construction of the present top frame as indicated at 7 between the front and rear ends of the horizontal frame member, said bent-wood bows being of sufficient length to span the space between the side rails 5 with their ends disposed above the upper edges of said side rails where they are fixedly joined to the latter by means of a metal stamping, as shown in Fig. 4 preferably constructed from sheet metal. As shown in Fig. 4, this stamping embodies a base plate portion 8 with suitable openings as at 9 for the reception of screws whereby the stamping is firmly fastened upon the upper edge of a side rail and formed with a central U-shaped upstanding member 10 opposed by an upwardly extending strap 11 which combine to provide a socket for receiving the end of the bow 7 where said end is securely retained by means of suitable screws passing through openings 12 in the strap 11 and into said bow 7. By this means a neat but durable connection is made.

The length of the side rails 5 is governed by the particular car or design of automobile that the frame is to be made for, any number of transverse bows 7 being used as required in connection with a touring car, roadster or closed body machine.

The strap 11 is stamped adjacent the point of connection of the same with the base plate 8 to provide a tongue 13 which is bent downwardly against the outer face of the adjacent side rail 5, and a screw or the like is passed through the opening 14 provided in said tongue 13 and into the side rail for effectively securing the plate 8 in position.

The front or forward end of the frame is to be supported on the wind shield 15 in the usual manner, a rear bow 16 being joined to the rear ends of the side rails 5 so as to project above and below the latter as clearly shown in Fig. 5 by means of a metal stamping at each joint, one of which stampings is clearly shown in Fig. 3.

This metal stamping is made from one piece of sheet metal of proper thickness to give the required strength and is formed to provide a plate portion 17 with a flange 18 along one edge, the plate portion 17 being disposed against the adjacent edge of the adjacent leg of the rear bow 16 and the flange 18 being disposed against the adjacent side face thereof and secured so disposed by means of screws or the like passing through openings 19 in the plate portion 17 and openings 20 in the flange 18.

The edge of the plate 17 opposite that from which the flange 18 extends is provided with a flange 21 extending in the opposite direction and parallel to and spaced from another flange 22 alined with the flange 18 and formed by being stamped from the plate 17. The flanges 21 and 22 are provided with a series of alined openings 23.

The rear ends of the side rails 5 are provided with transverse openings for reception of a bolt 24 or the like which also passes through desired alined ones of the openings 23 for pivotally attaching the rear bow to said side rails, and it will be seen that the angle of the rear bow may be changed relative to the side rails by moving the rear ends of the side rails up or down between the flanges 21 and 22 and correspondingly changing the position of the bolt 24 in the openings 23. In this way the upper part of the rear bow is also kept in correct position relative to the transverse bows 7. Suitable metal slat arms 25 are attached to the free ends of the rear bow 16 whereby the latter may be fastened to the car body by engaging the "stubs" usually provided upon the bodies at the point indicated at 26 in Fig. 1 rearwardly of the rear door when equipping a touring car.

It will be seen that the manner of fastening the ends of the transverse bows to the side rails is simple and inexpensive and allows the inside of the top to be finished as a full lined top, as known to the trade, and each individual transverse bow can be covered, although an unlined or natural wood finish can be used on the inside of the entire frame.

In using the metal stampings to assemble the transverse bows and side rails, there will be no parts to interfere with the fastening of either an inside lining or a bow covering, and if finished as an unlined natural wood top, a neat appearance would be presented from the inside of the car.

From the foregoing description it will be seen that the rear bow 16 may be readily folded upwardly adjacent the side rails as shown in Fig. 2 for convenience in crating for shipment and that the rear bow may be swung to the operative position of Fig. 5 when it is desired to place the top on the body of the car to be trimmed. It will also be seen that the present invention provides a simple and durable form of assembled top frame convenient for auto manufacturers whereby the auto top builder may readily set the frame on the body of the automobile and trim the same as desired.

It is believed that the construction as well as the advantages of the present invention will be readily understood and appreciated by those skilled in the art.

Minor changes may be made in the invention without departing from the spirit and scope thereof.

What is claimed as new is:—

1. An automobile top frame comprising a substantially U-shaped horizontal member providing side rails connected at their forward ends, transverse bent-wood bows fastened at intervals to said side rails, a rear bow pivotally attached to the rear ends of said side rails whereby said rear bow may swing to a horizontal position substantially parallel with and beneath the side rails, means to permit pivotal attachment of the rear bow to the rear ends of the side rails in different adjusted positions whereby the angle and height of said rear bow may be changed relative to said side rails, said last named means embodying a metal stamping rigidly attached to each leg of the rear bow and having a pair of spaced flanges engaging opposite sides of the end of the adjacent side rail, the said flanges being provided with a series of alined openings, the ends of each of the side rails being provided with a transverse opening adapted to be selectively alined with desired ones of the openings of said flanges, and a bolt adapted to be secured through the alined openings of the end rails and the flanges.

2. In an automobile top construction of the rigid type, the combination with rigidly connected side rails of transverse bows therefor, and means to permanently attach the ends of said bows above the upper edges of and to said side rails, said last named means including a metal stamping for each end of each bow comprising a base plate member with a U-shaped upstanding member and an upwardly extending strap opposed to said U-shaped member forming a socket for reception of the adjacent end of the bow.

3. In an automobile top construction of the rigid type, the combination with rigidly connected side rails of transverse bows therefor, means to permanently attach the ends of said bows above the upper edges of and to said side rails, said last named means including a metal stamping for each end of each bow comprising a base plate member with a U-shaped upstanding member and an upwardly extending strap opposed to said U-shaped member forming a socket for reception of the adjacent end of the bow, and a depending tongue stamped from said upwardly extending strap arranged to engage the outer face of the adjacent side rail.

4. In an automobile top construction of the rigid type, the combination with rigidly connected side rails of transverse bows therefor, means to permanently attach the ends of said bows above the upper edges of and to said side rails, said last named means including a metal stamping for each end of each bow comprising a base plate member with a U-shaped upstanding member and an upwardly extending strap opposed to said U-shaped member forming a socket for reception of the adjacent end of the bow, a depending tongue stamped from said upwardly extending strap arranged to engage the outer face of the adjacent side rail, and means to secure said base plate strap and tongue flatly against the bow and side rail.

In testimony whereof we affix our signatures.

MILO J. GORRELL.
HARRY S. McLEOD.